UNITED STATES PATENT OFFICE.

BERTRAM MAYER AND ALFRED SCHAARSCHMIDT, OF BASEL, SWITZERLAND, ASSIGNORS TO THE FIRM OF SOCIETY OF CHEMICAL INDUSTRY IN BASLE, OF BASEL, SWITZERLAND.

ORANGE-TO-YELLOW VAT DYE AND PROCESS OF MAKING SAME.

No. 902,895.     Specification of Letters Patent.     Patented Nov. 3, 1908.

Application filed April 21, 1908. Serial No. 428,339.

*To all whom it may concern:*

Be it known that we, BERTRAM MAYER, doctor of philosophy and chemist, a subject of the King of Bavaria, and resident of Basel, Switzerland, and ALFRED SCHAARSCHMIDT, doctor of philosophy and chemist, a subject of the King of Saxony, and resident of Basel, Switzerland, have invented new and useful Orange-to-Yellow Vat Dyes and a Process of Making Same, of which the following is a full, clear, and exact specification.

We have found that by heating in the lateral chain halogen substituted methylanthraquinones and methylhalogen-anthraquinones with sulfur at a high temperature and by treating subsequently the raw product thus obtained with a hypochlorite new valuable vat-dyes are obtained, which dye unmordanted cotton from an alkaline vat clear orange to yellow tints fast to washing, light and chlorin. The manufacture of these new vat-dyes is illustrated by the following examples:

Example I. 5 parts of omega-dichlor-2-methylanthraquinone or the raw product obtained by d hlorinating the 2-methylanthraquinone and consisting of a mixture of omegamonochlormethylanthraquinone and of omegadichlormethylanthraquinone are heated with 15 parts of sulfur for 3 to 4 hours at 270–280° C. The cooled melted mass is finely pulverized and purified from the admixed sulfur by extracting the mass, several times, with carbon disulfid or a hot aqueous solution of sodium sulfid. The product thus obtained, which yields by its treatment with an alkaline solution of a hydrosulfite a red-brown vat dyeing cotton pale-yellow tints, is then diluted with water in order to form a fluid mass which is heated at the temperature of water bath while a solution of sodium hypochlorite is added, until the formation of foam ceases. After cooling the dye is separated by filtration, washed with water, pressed and dried. The new dye is obtained in the form of an orange-yellow powder dissolving in concentrated sulfuric acid with a dirty wine-red coloration and in fuming sulfuric acid of 24 per cent. anhydrid with a deep blackish green coloration. In the most of the organic solvents it is only a little soluble. With soda lye and hydrosulfite it yields a red-brown vat dyeing cotton red-brown tints turning to a vivid orange by their exposition to the air. The dyeings are very fast to washing, light and chlorin. In order that the dye may be employed more easily in vat-dyeing it is sold preferably in the form of a finely divided paste, as it may be obtained according to known methods, for instance by pouring a sulfuric solution of the dye into ice water etc.

If in the foregoing example the omega-dichlor-2-methylanthraquinone be replaced by omegamonochlor-2-methylanthraquinone or omegamonobrom-2-methylanthraquinone a more orange-yellow dye is obtained, if the reaction is performed at a temperature of 260 to 280°., while when the reaction is performed at 300 to 330° C. the dyeings furnished by the resulting dye can hardly be distinguished from those of the dye obtained according to Example I. But if the reaction be performed at a temperature of 220–230° C. a pure yellow dye will be obtained.

Example II. 100 parts of omegamonochlor-2-methylanthraquinone are heated together with 30 parts sulfur for 3 to 4 hours to 200–230° C. The melted mass is cooled down, finely pulverized and extracted several times with carbon disulfid or a solution of sodium sulfid. The raw product thus obtained is mixed with water to form a thick paste to which sodium hypochlorite is added, the mixture being then stirred during about 1 hour at the ordinary temperature or the water bath temperature. The resulting dye is separated by filtration, washed with water and dried. It constitutes a yellow powder, sparingly soluble in the most of the organic solvents even hot, as for instance chloroform, benzene, glacial acetic acid etc., in hot nitro-benzene it dissolves sufficiently easily with a greenish-yellow color and is precipitated from the solution, when this latter is cooled down, in the form of pale-yellow flocks. It dissolves in concentrated sulfuric acid to a red-violet solution from which the dye is reprecipitated by adding water in the form of brownish-yellow flocks. It dissolves in fuming sulfuric acid of 24 per cent. anhydrid with a dirty olive-green coloration. With soda lye and hydrosulfite it yields a violet-brown vat dyeing unmordanted cotton violet-brown tints turning by their exposition to the air or more quickly by their passage through a dilute solution of sodium hypochlorite to clear yellow tints fast to washing, light and chlorin.

Example III. 100 parts of the 2-methyl-3-chloranthraquinone melting at 215° C. (obtained by condensing orthochlortoluene with phthalic anhydrid and aluminum chlorid and by heating the resulting chlortoluybenzoic acid with concentrated sulfuric acid) are heated to 200–220° C. and, at this temperature, a current of chlorin is introduced in the mass until an increasing of weight of 14 parts has taken place.

The raw omegamonochlor-2-methyl-3-chloranthraquinone thus obtained can be employed directly to the preparation of the dye or be purified by recrystallization from glacial acetic acid. The pure omega-chlor-2-methyl-3-chloranthraquinone melts at 205° C. For its transformation into the dye, 9 parts of the said chlorinated product (purified or not) are heated with 30 to 40 parts of sulfur to 250 to 290° C., until no further hydrochloric acid escapes from the mass, what occurs generally after about 3 hours. The pulverized melted mass is liberated from the excess of sulfur by extracting the same with carbon disulfid or with an aqueous solution of sodium sulfid and can be employed for dyeing directly or after it has been purified by a treatment with sodium hypochlorite as in Example I.

The dye dissolves in concentrated sulfuric acid with a violet coloration and in fuming sulfuric acid of 24 per cent. anhydrid with an olive-green coloration.

From its red-brown colored alkaline hydrosulfite vat, it dyes cotton red-brown tints turning to a clear orange by their exposition to the air These dyeings are fast to washing, light and chlorin.

If in the Example III, the reaction is performed at a temperature of 230 to 245° C. the resulting dyestuff dissolves in concentrated sulfuric acid with a red coloration and in fuming sulfuric acid of 24 per cent. anhydrid with an olive-green coloration and dyes cotton more yellowish tints. On the other hand, if in the Example III omega-dichlor-2-methyl-3-chloranthraquinone or the mixture of omegamonochlor derivate and omegadichloro derivative obtained by dichlorinating 2-methyl-3-chloranthraquinone are substituted for the omegamonochlor-2-methyl-3-chloranthraquinone, the resulting coloring matters possess analogous properties.

In an analogous manner is effected the preparation of dyes by replacing the chloro derivates of the Example III by the corresponding bromo derivatives.

What we claim is:

1. The described process for the manufacture of orange to orange-yellow vat-dyes of the anthracene-series by heating omega-halogen substituted 2-methylanthraquinones with sulfur to a high temperature.

2. The described process for the manufacture of orange to orange-yellow vat-dyes by heating omegahalogen substituted 2-methylanthraquinones with sulfur to a high temperature and then treating the resulting raw-products with a hypochlorite.

3. The described process for the manufacture of orange to yellow vat-dyes by heating omegahalogen substituted 2-methylhalogen-anthraquinones with sulfur to a high temperature.

4. The described process for the manufacture of orange to yellow vat-dyes by heating omegahalogen substituted 2-methylhalogen-anthraquinones with sulfur to a high temperature and then treating the resulting raw products with a hypochlorite.

5. The described process for the manufacture of orange to yellow vat-dyes by heating omegahalogen derivatives of 2-methyl-3-chloranthraquinone with sulfur to a high temperature and then treating the resulting raw products with a hypochlorite.

6. As new products the dyes which can be obtained by heating omegahalogen derivatives of 2-methylanthraquinone with sulfur to a high temperature and then treating the resulting raw products with a hypochlorite and constitute in a dry state orange to yellow powders soluble in concentrated sulfuric acid to dirty claret-colored to reddish violet solutions and in fuming sulfuric acid of 24 per cent. anhydrid to blackish-green to olive-green solutions and yielding with soda-lye and hydrosulfite vats dyeing cotton orange to yellow tints fast to washing, light and chlorin.

7. As new products the dyes which can be obtained by heating omegahalogen derivatives of 2-methyl-3-chloranthraquinone with sulfur to a high temperature and then treating the resulting raw products with a hypochlorite, and constitute in a dry state orange to yellow powders soluble in concentrated sulfuric acid to claret-colored to violet solutions and in fuming sulfuric acid of 24 per cent. anhydrid to blackish-green to olive-green solutions and yielding with soda-lye and hydrosulfite vats dyeing cotton orange to yellow tints fast to washing, light and chlorin.

In witness whereof we have hereunto signed our names this 8th day of April, 1908, in the presence of two subscribing witnesses.

BERTRAM MAYER.
ALFRED SCHAARSCHMIDT.

Witnesses:
  Geo. Gifford,
  Amand Ritter.